(12) United States Patent
Jackson

(10) Patent No.: US 7,326,336 B2
(45) Date of Patent: *Feb. 5, 2008

(54) WATER INTAKE ROTARY SCREEN

(75) Inventor: Philip Jackson, Paris (FR)

(73) Assignee: E. Beaudrey et Cie, Paris (FR)

( * ) Notice: Subject to any disclaimer, the term of this patent is extended or adjusted under 35 U.S.C. 154(b) by 5 days.

This patent is subject to a terminal disclaimer.

(21) Appl. No.: 11/207,873

(22) Filed: Aug. 22, 2005

(65) Prior Publication Data
US 2006/0037897 A1  Feb. 23, 2006

(30) Foreign Application Priority Data
Aug. 20, 2004 (FR) ................... 04 09025

(51) Int. Cl.
*E03F 5/14* (2006.01)

(52) U.S. Cl. ............ 210/158; 210/159; 210/160; 210/391; 210/400

(58) Field of Classification Search ............... 210/158, 210/159, 160, 391, 393, 400, 401, 411
See application file for complete search history.

(56) References Cited

U.S. PATENT DOCUMENTS

| 2,066,479 | A | * | 1/1937 | Macisaac ............... 210/411 |
| 4,188,294 | A | | 2/1980 | Hagihara |
| 4,518,494 | A | | 5/1985 | Jackson et al. |
| 4,772,398 | A | * | 9/1988 | Sando et al. ............ 210/391 |
| 4,814,076 | A | | 3/1989 | Jackson et al. |
| 4,867,879 | A | | 9/1989 | Mueller et al. |
| 4,889,629 | A | * | 12/1989 | Jackson ................... 210/401 |
| 5,217,512 | A | | 6/1993 | Williams et al. |
| 5,393,418 | A | * | 2/1995 | Jackson ................... 210/159 |
| 5,501,793 | A | | 3/1996 | Cheesman et al. |
| 6,572,763 | B2 | * | 6/2003 | Gorshing ................. 210/159 |
| 2005/0279680 | A1 | * | 12/2005 | Jackson ................... 210/158 |

FOREIGN PATENT DOCUMENTS

FR  2 609 643  7/1988
GB  2 113 121  8/1983

* cited by examiner

Primary Examiner—Christopher Upton
(74) Attorney, Agent, or Firm—Young & Thompson

(57) ABSTRACT

The water intake rotary screen comprises a mobile filter designed as an endless loop formed of a succession of flexible and articulated filter panels. It is associated with a suction system adapted to generate a local contraflow through the filter to take up successively elements retained thereby and direct them to the exterior.

12 Claims, 3 Drawing Sheets

WATER INTAKE ROTARY SCREEN

BACKGROUND OF THE INVENTION

The present invention relates generally to the screens with filter elements that are usually fitted to water intakes, either river water intakes or seawater intakes, to block debris and particles carried by the water drawn in.

A water intake screen is normally on the downstream side of a grid with bars a few centimeters apart protecting it from large debris, either on its own or in combination with one or more other screens of the same type forming part of the same screening station.

Prior art filter elements, which have a mesh size of only a few millimeters, are mobile so that they can be periodically cleared of debris and particles larger than their mesh size, which progressively obstruct all of the mesh and therefore block the filter element.

The present invention relates more particularly to the rotary screens known as "chain filters" that are commonly encountered in water intakes in the United States and in Japan in particular. In these rotary screens, consecutive flexible articulated rectangular filter panels or elements are carried by two chains, one on each side, forming an endless loop of elongate cross section constituting said chain filter.

A filter element of this kind passes cyclically from an immersed position, in which it is progressively charged with debris and diverse particles, to an out of the water position, in which it is subjected to contraflow pressurized water jets to clear it of the particles and debris that have accumulated on its surface in the above manner, to enable it to resume its filtering function when it is next immersed.

At present, the particles and debris entrained by the washing water are usually collected in and drained off via a channel provided for this purpose.

It would seem that until now the fact that the debris and particles are of mineral and vegetable origin and contain lifeforms, in particular fish, has not been a matter for concern except in a few particularly sensitive locations.

This is no longer the case today, when the widespread concern to protect the natural environment is taken much more seriously, especially in the case of protecting aqueous lifeforms, when greater amounts of water are taken from rivers and the sea, in particular by nuclear power stations, and in view of the fact that the problem is aggravated by the current tendency to install for this purpose water intakes with large flowrates on ecologically sensitive estuaries or on the seashore.

Now it is clear that these lifeforms, and in particular fish trapped and entrained by the filter element of a screen of a water intake of this kind, are inevitably removed from the water, often for a long time, are exposed to the usually brutal effect of the washing water jets applied to the filter element while it is out of the water, and suffer the resulting violent splashing in the channel for recovering particles and debris temporarily blocking the filter element in question.

Various systems to be fitted to a water intake screening station to save lifeforms and in particular fish carried by the water drawn in have already been proposed.

However, at present, these are either special filters that in themselves merely save fish, with no general screening function, or conventional screening filters that still remove fish from the water.

One prior art system which avoids removing fish from the water and the resulting trauma is disclosed in French patent No. 7720258. It is used only in rigid drum filters and provides a recovery channel below the lowest water level. The recovery channel is provided with pressure reducing means that induce a reverse flow of water through the filter element that is sufficient to entrain lifeforms retained thereby.

However, this kind of recovery channel is designed only to be installed on rigid filter drums and not on chain filters whereof the filter comprises a succession of flexible articulated filter panels.

SUMMARY OF THE INVENTION

One object of the present invention is precisely to save fish at the same time as providing the required screening means for a chain filter.

The invention relates to a chain filter rotary screen for a water intake comprising a filter mobile as an endless loop and formed of a succession of flexible and articulated filter panels.

According to a general definition of the invention, the rotary screen is associated with a suction system adapted to generate a local contraflow through the filter to take up successively elements retained thereby and direct them to the exterior.

In practice, the suction system is fixed below the lowest water level of the water intake.

One embodiment of the screen further comprises a washing manifold and an evacuation unit on either side of the filter.

Each filter panel advantageously comprises openings individually delimited by parallel channels elongated perpendicularly to their plane and having a hydrodynamic profile, the thickness of the panel being perpendicular to the plane of the openings to constitute a honeycomb structure.

In another embodiment, each filter panel includes a horizontal median partition dividing the panel longitudinally into two compartments.

In practice, the suction system comprises a suction pump and a suction tube.

For example, the suction pump comprises a volumetric centrifugal pump comprising an enclosed impeller and a booster screw.

The suction tube preferably extends horizontally over the width of the filter panel and includes an opening defined by two branches.

According to another feature, the screen comprises a fixed mask above the suction system.

According to a further feature, the suction tube comprises shields forming retaining shoes above and below the opening of the suction tube and is associated with guides for the panels on either side of the suction tube.

The suction tube further comprises flexible lips at the entry of the opening of the suction tube to distribute the flow over the width of the suction tube whilst allowing the occasional passage of larger elements.

The suction tube is advantageously articulated about a pivot axis below the lower shield.

Apart from the essential advantage of obtaining the required protection of elements conveyed by the water drawn in, the suction system of the invention also has the two-fold advantage of being totally static, which guarantees ruggedness, reliability and a long service life, and of accommodating current water intake filter element screen technology, regardless of the nature of the filter elements, so that it can easily be added to screens of this kind that are already in service, if required.

BRIEF DESCRIPTION OF THE DRAWINGS

Other features and advantages of the invention will become apparent in the light of the following detailed description and the drawings, in which.

DETAILED DESCRIPTION OF THE INVENTION

Figure 1:
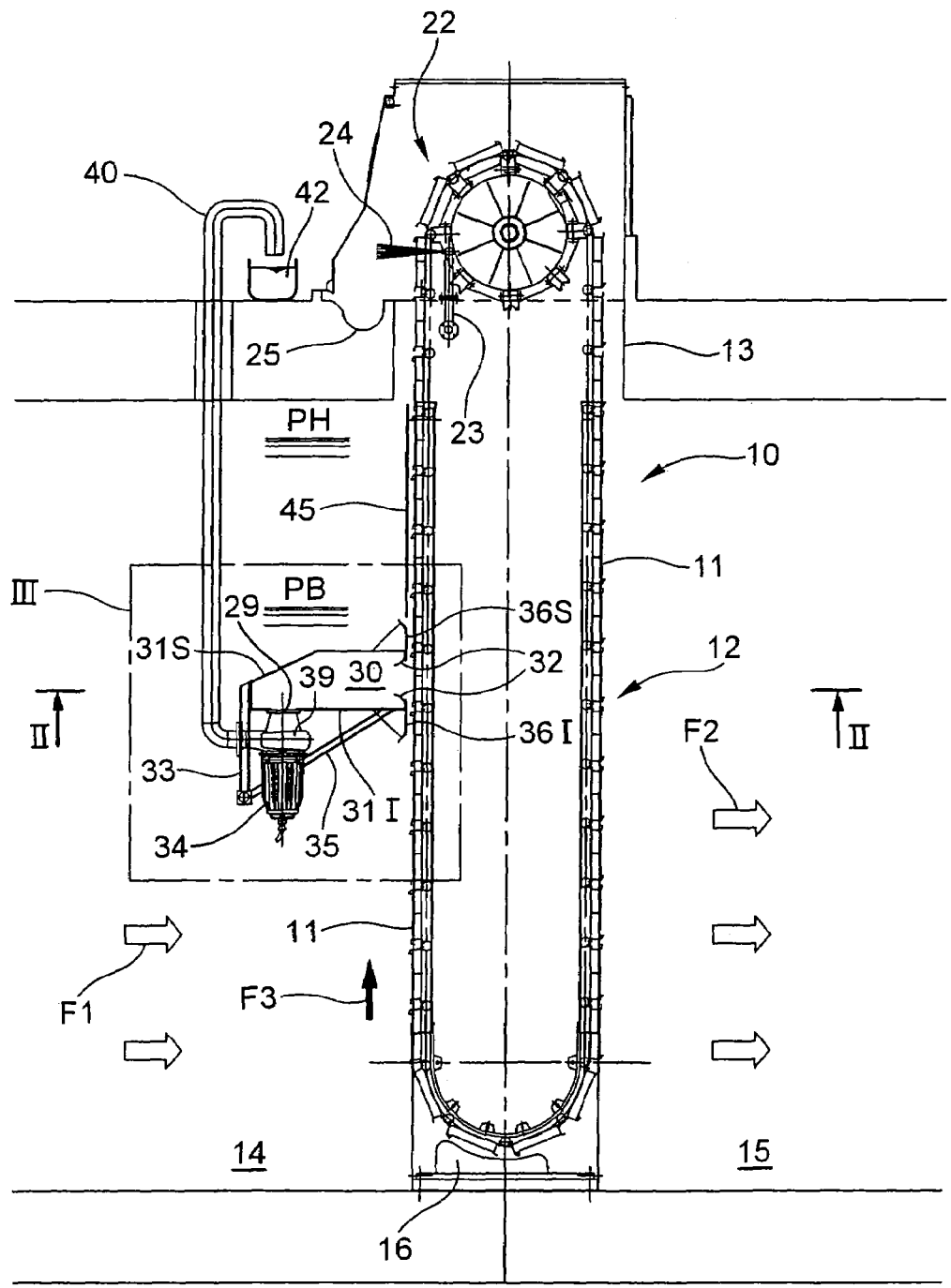
FIG. 1 is a view in cross section of a screening station including a device of the invention for saving fish.
Figure 2:
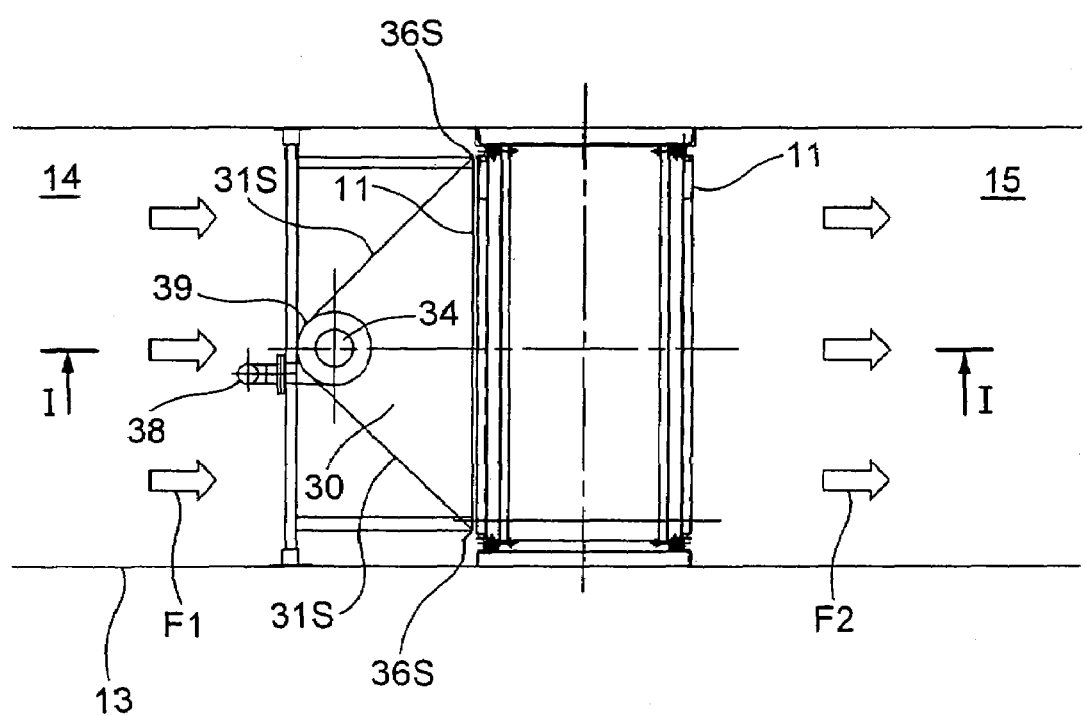
FIG. 2 is a plan view of the screening station in section taken along the line II-II in FIG. 1.
Figure 3:
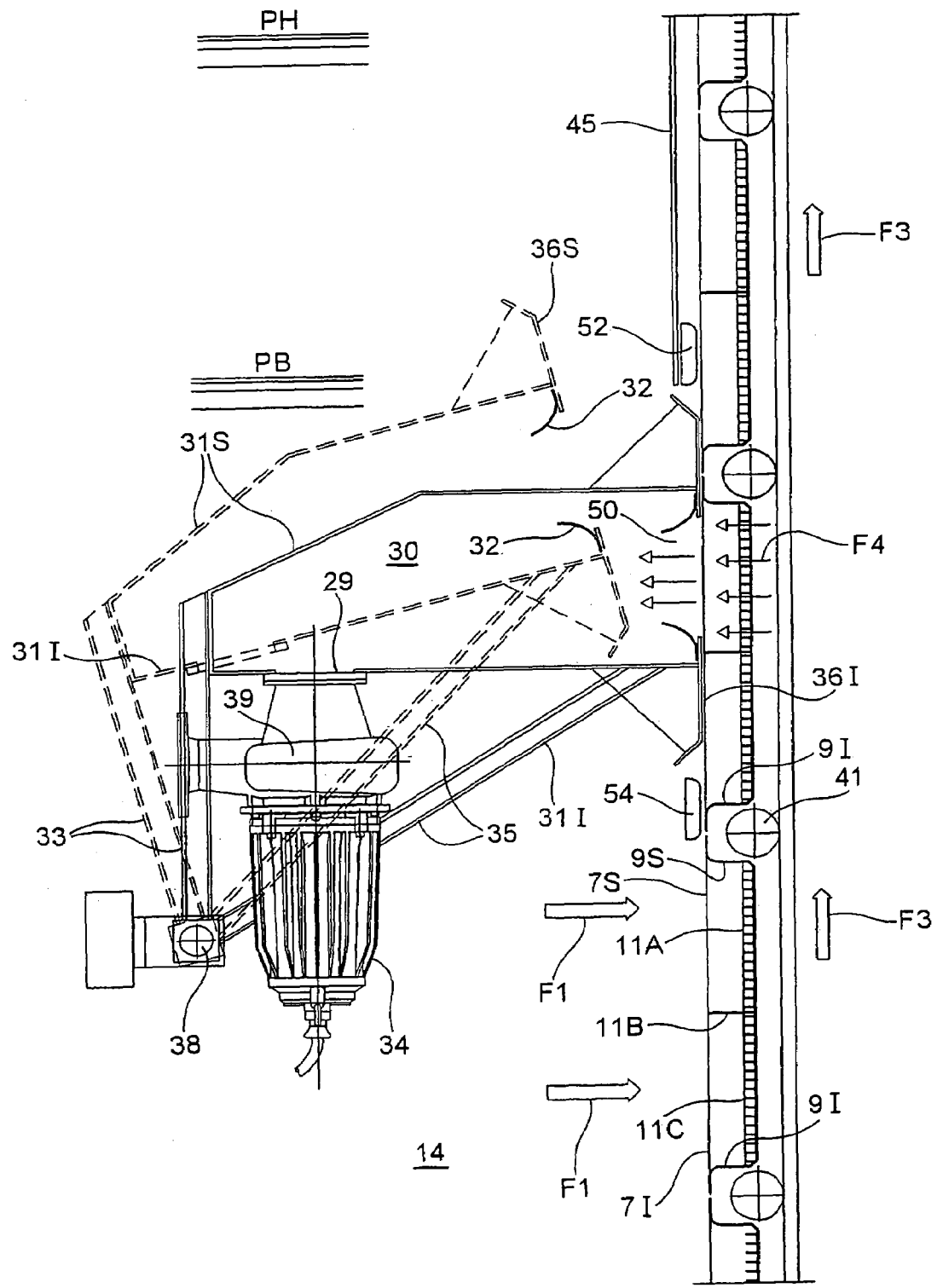
FIG. 3 shows to a larger scale the portion III of FIG. 1.

The above figures show the application of the invention to a direct passage rotary chain filter 10, filter elements 11 known as filter panels being disposed across the flow and carried by two chains, one on each side, constituting an elongate vertical endless loop, the upper and lower shafts being disposed longitudinally.

In the example shown, the chain filter 10 is inside a channel 12 between two vertical walls 13 and therefore delimits two areas, namely, on the upstream side of the channel, an area 14 in which the water to be screened arrives in the direction of the arrow $F_1$, and a downstream area 15 from which the screened water exits in the direction of the arrow $F_2$ for subsequent use. The construction of a direct passage chain filter is well known in the art and is described here only in outline.

The consecutive panels form a loop supported by coaxial sprockets with the upper portions whereof the chains carrying the panels mesh.

The shaft carrying the upper sprockets rotates in two bearings, one on each side, and is driven in rotation in the direction of the arrow $F_3$ by a drive system that is known in the art. The bearings are carried by a frame that generally slides in vertical guides embedded in the walls. On each lateral edge of each panel a mobile sealing system known in the art prevents unfiltered water from bypassing the filter elements by passing between the fixed vertical uprights of the frame and the edges of the panels.

Similarly, at the junction of two panels at the horizontal edges where the panels are articulated, a sealing system known in the art prevents unfiltered water passing between the two panels.

In the lower part, where the panels turn on lower rails before rising, a curved transverse plate 16 provides a clearance between the upstream lips of the panels and said curved plate that is smaller than the mesh size of the filter element. This prevents the upstream to downstream passage of any debris larger than the mesh size.

In the embodiment shown, the water flows through the upstream face of the chain filter from the chamber 14 to the chamber 15 and then, cleared of debris and lifeforms, through the downstream face.

As shown in FIG. 1, in practice the filter 10 is only partially immersed in the water to be filtered.

FIG. 1 shows the lowest water level PB and the highest water level PH.

The part of the filter 10 that is out of the water is usually associated with a washing station 22 above the highest water level PH and on the upstream side of the portion of the chain filter 10 that is out of the water relative to the direction of movement of the filter element, i.e. the rotation direction, as indicated by way of example by the arrow $F_3$ in FIG. 1.

As known per se, the washing station 22 includes, inside the filter 10, one or more washing manifolds 23 adapted to spray a substantially perpendicular water curtain 24 through the filter element 11 of the filter and, outside the filter 10, in corresponding relationship with the manifold or manifolds 23, a channel 25 for collecting debris detached from the filter by the water curtain 24.

Each filter panel 11 passes in front of a suction tube 30 just below the level PB. The suction tube 30 extends horizontally the entire width of the filter panel 11. It has a rectangular opening 50 whose height is of the same order of magnitude as the height of the compartment of the filter panel to be cleaned. This opening 50 extends the entire length of the suction tube and the panel. The edges of the opening 50 are fitted with flexible lips 32 to restrict the flow of water to the downstream side of the opening 50 in order to distribute the flow over the whole of the length of the suction tube without preventing the occasional passage of more bulky debris.

The general shape of the suction tube converges in the direction of the upstream side of the channel 14. The suction tube comprises two branches 31 defining the opening 50 of the suction tube, namely an upper branch 31S and a lower branch 31I. The upper branch 31S is supported by an intermediate arm 33 and the lower branch is supported by an intermediate arm 35. The two intermediate arms 33 and 35 are connected together by a pivot 38.

The suction tube 30 feeds a suction pump 39 which has an inlet 29. The pump 39 is of the type combining a volumetric booster screw 34 with a single-channel centrifugal outlet. The booster screw is enclosed in an external cone.

Compared to other pumps able to provide the required flowrate and pressure of a fluid charged with debris, this type of pump, often called a Hydrostal pump, has the characteristic of not creating even the slightest pressure drop anywhere in its internal circuit. No fish or other aquatic creature can indeed survive a sudden pressure drop, even of short duration. Moreover, with its enclosed rotor, this pump prevents fish being injured by rigid walls moving at relatively high speed relative to the water.

The pump is fixed either to supports fastened to the frame of the filter or to a chassis fixed to the lateral walls 13. It discharges the water, debris and aquatic lifeforms either into a pipe 40 or into a channel 42 for discharging them into a safe area.

The suction tube 30 is fitted with a shield 36S above the suction opening 50 and a shield 36I below it which cooperate with the lips 32 of the compartments of the panel to ensure that water passes only in contraflow through the filter element 11 being washed by suction. The upper shield 36S is at the end of the upper branch 31S and lower shield 36I is at the end of the lower branch 31I.

The suction tube 30 is articulated about a pivot axis 38 lower than the lower end of the shield 36I. In this way, if a large body on the filter panel projects far enough to interfere with the shield of the suction tube on rising, the suction tube 30 is pushed upward, disengaging it from the filter 11 and thus allowing the large debris to pass before it returns to its service position.

A wall 45 above the shield 36S of the suction tube is just above the highest water level PH. This wall (or fixed mask) 45 is fixed to the frame of the filter. It prevents the passage of unfiltered water if the water level is above the level of the upper shield 36S of the suction tube. This is particularly advantageous in that it reduces the size and the mass of the suction tube 30 whilst assuring the same function.

The filter panels 11 comprise a frame whose height is equal to the pitch 41 of the chains that carry them (which is generally from 500 mm to 600 mm). The width of the filter panels 11 is slightly less than the distance between the walls 13 of the channel.

To be efficient, it is desirable for the countercurrent flowrate drawn in by the suction tube to be at least equal to that passing through the filter and depositing debris thereon. This flowrate conditions the size and power of the pump and the diameter of the evacuation pipes. It is therefore beneficial, for economic reasons, for this flowrate to be as low as possible.

The size of the filter panels being fixed, the area to be washed is reduced by installing a horizontal median separator 11B that divides the panel into two compartments 11A and 11C.

Thus the panel consists of a longitudinal upper membrane 9S, a median separator 11B and a lower membrane 9I. Two vertical uprights 7I and 7S situated on either side connect the membranes 9I and 9S to each other. The sections are chosen so that the upstream edges of all these elements lie in a common vertical plane, thereby providing a minimum clearance from the shields 36I and 36S of the suction tube 30.

The filter element is fixed in the plane of the downstream edges of the frame of the panel. The height of the membranes 9I and 9S thus produces a box in which debris stopped by the filter element can be stored pending washing. In practice, the depth of these compartments is at least 10 cm.

Fish and other lifeforms stopped by the filter must be protected from injury while they remain on the filter element pending washing.

The filter element of French patent No. 8700429 is particularly beneficial in this situation because it has a totally plane upstream surface with components with rounded edges made from a composite material that is softer than a metal filter, for example. In this kind of filter, each filter panel comprises openings individually delimited by elongate parallel channels perpendicular to their plane and having a hydrodynamic profile, the thickness of the panel being perpendicular to the planes of the openings, resulting in a honeycomb structure.

Moreover, contraflow washing by means of the suction tube is improved because fibrous elements and jellyfish are unable to attach themselves to the frame.

Note that the contraflow through the filter elements created by the suction tube generates a head loss that tends to move the filter panel toward the shield of the suction tube and can cause jamming.

Jamming is prevented by providing on each side of the panel local retaining slideways 52 and 54 at the level of the suction tube 30. These slideways or retaining shoes 52 and 54 therefore prevent movement in the upstream direction of the filter, which is relatively flexible compared to a rigid filter drum.

Thus the present invention is installed on a chain filter and includes a suction tube 30 adapted to remove elements stopped on the filter panels 11 by a contraflow created by means of a volumetric centrifugal pump 34, 39.

The panels 11 are held so that they are not themselves drawn toward the suction tube 30, which would interfere with their movement in translation. The pump discharges elements detached from the filter panels via a water pipe and/or channel to an area of the natural environment in which fish and other aquatic lifeforms can return to their usual environment without risk of being recycled to the water intake.

The invention claimed is:

1. Water intake rotary screen comprising a mobile filter disposed in an endless loop and formed of a succession of flexible and articulated filter panels, in combination with the a suction system adapted to generate a local contraflow through the filter to take up successively elements retained thereby and to direct them to the exterior, wherein the suction system comprises a suction pump and a suction tube, the suction tube being articulated about a pivot axis for movement between a fixed service position wherein the suction tube faces the filter to engage therewith and a disengaged position wherein said suction tube is disengaged from the filter, thereby allowing large debris to pass.

2. Screen according to claim 1, characterized in that the suction system is fixed below the lowest water level of the water intake.

3. Screen according to claim 2, further comprising a washing manifold and an evacuation unit on either side of the filter.

4. Screen according to claim 1, further comprising a washing manifold and an evacuation unit on either side of the filter.

5. Screen according to claim 1, wherein each filter panel comprises openings individually delimited by parallel channels elongated perpendicularly to their plane and having a hydrodynamic profile, the thickness of the panel being perpendicular to the plane of the openings to constitute a honeycomb structure.

6. Screen according to claim 5, wherein each filter panel includes a horizontal median partition dividing the panel longitudinally into two compartments.

7. Screen according to claim 1, wherein the suction pump comprises a volumetric centrifugal pump comprising an enclosed impeller and a booster screw.

8. Screen according to claim 1, wherein the suction tube extends horizontally over the width of the filter panel and includes an opening defined by two branches.

9. Screen according to claim 1, characterized in that it comprises a fixed mask above the suction system.

10. Screen according to claim 1, characterized in that the suction tube comprises shields forming retaining shoes above and below the opening of the suction tube and is associated with guides for the panels on either side of the suction tube.

11. Screen according to claim 10, characterized in that the suction tube (30) further comprises flexible lips at the entry of the opening of the suction tube (30) to distribute the flow over the width of the suction tube whilst allowing the occasional passage of larger elements.

12. Screen according to claim 10, wherein said pivot axis is below the lower shield.

* * * * *